June 6, 1961 J. B. PETTEGREW 2,987,676
PULSE GENERATOR
Filed Dec. 31, 1957

Inventor
John B. Pettegrew
By Schroeder, Hofgren, Brady & Wegner
Attorneys 2,987,676
Patented June 6, 1961

2,987,676

PULSE GENERATOR

John B. Pettegrew, Elmhurst, Ill., assignor to The Hallicrafters Co., a corporation of Delaware Filed Dec. 31, 1957, Ser. No. 706,441
4 Claims. (Cl. 328—59)

This invention relates to a pulse generator and more particularly to a pulse generator for producing pulses of the order of a microsecond and shorter at microwave frequencies.

Present pulse generators, in which, for example, oscillators may be turned on and off by a square wave from a multivibrator, are limited in the nature of a pulse they provide by several things, for example: the response time of the oscillator, the maximum frequency of the multivibrator, and the shape of the output wave of the multivibrator.

It is a principal object of this invention to provide an apparatus for generating radio frequency pulses, particularly in the microwave region, having a shorter duration and better wave form characteristics than have heretofore been possible.

One feature of the invention is the provision of a pulse generator including a source of oscillation, gating means connected to the source and control means for sequentially turning the gating means on and off to provide a pulse of oscillations of duration determined by the time interval between turning the gating means on and turning it off. Another feature is that the control means comprises a first control signal generator for turning the gating means on and a second control signal generator for turning the gating means off; and that the two gating control signal generators are synchronized.

A further feature is that the gating means includes first and second control devices with the first control device normally non-conducting and the second control device normally conducting. And a further feature is that the control devices are traveling wave amplifying tubes; and an attenuator is connected between them.

Further features and advantages will readily be apparent from the following specification and from the drawings, in which.

While the pulse generator described herein is particularly designed for producing pulses of extremely short duration, as of the order of from a fraction to several microseconds, of microwave energy, the basic principle may be used for longer pulses and at lower frequencies. The particular elements of the system described herein are intended to be exemplary of an operative system, and many variations and substitutions will be apparent to those skilled in the art.

Figure 1:
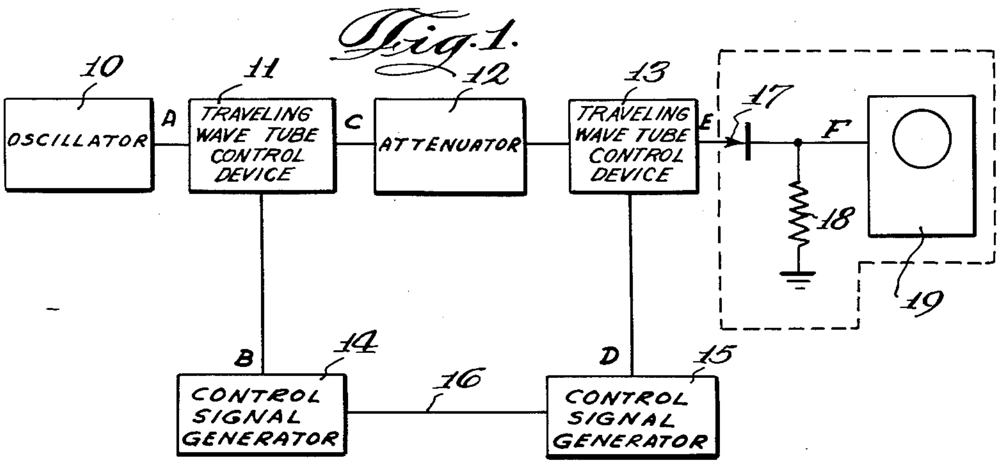
FIGURE 1 is a block diagram of an embodiment of the invention.

Turning now to FIGURE 1 of the drawing, an oscillator 10 has its output connected to the input of a first control device 11. The output of the first control device is connected through an attenuator 12 to the input of a second control device 13. First and second control signal generators 14 and 15 are connected to the first and second control devices 11 and 13, respectively.

The oscillator 10 produces a continuous signal at the desired frequency, the signal being coupled to the first control device, which, in the preferred form of the apparatus, is an amplifying element biased to the cutoff condition. The first control signal generator 14 produces a pulse signal which is coupled to the first control device 11, rendering it operative or conductive. The resultant burst of radio frequency energy in the output of the first control device 11 is coupled through attenuator 12 to the input of second control device 13, also preferably an amplifying element, and normally biased in a conductive condition. The second control signal generator 15 produces a control pulse which serves to cut off the second control device 13, after the first control device 11 is rendered conductive. The pulse of radio frequency energy appearing in the output of second control device 13 thus has a width determined by the time interval between the initiation of the conductive portion of the cycle of first control device 11 and the initiation of the cut off or non-conductive portion of the cycle of second control device 13.

The second control signal generator 15 is preferably connected with the first control signal generator 14, as by line 16, and the control pulses are synchronized thereby. The second control signal generator preferably includes a variable or adjustable time delay network so that the time interval between the control signals may be varied at will.

In an exemplary embodiment of the system, for microwave use in the "S" band, the oscillator 10 is a Hewlett-Packard signal generator, Model 616A. The control devices 11 and 13 are medium powered traveling wave tubes, as the HA1–H. The control signal generators 14 and 15 are Hewlett-Packard pulse generators, Model 212A. Where the amplified output of the first control device 11 is such that it would overload the second control device 13, an attenuator 12 is inserted between these elements to reduce the amplitude of the signal in the input of the second control device.

Figure 2:
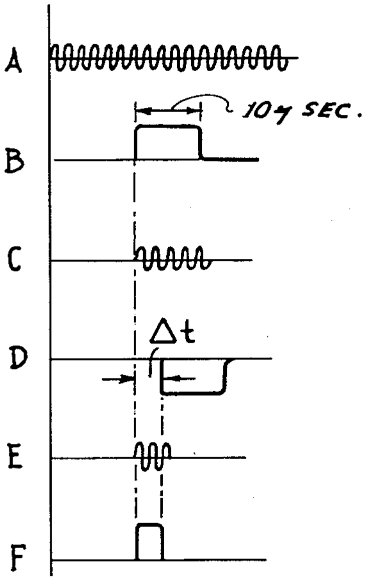
FIGURE 2 is a graphical representation of wave forms appearing at various points in the circuit of FIGURE 1.

Representative wave forms, designated A–F, are illustrated in FIGURE 2, and the corresponding letters in FIGURE 1 indicate the portion of the system at which the signals appear. Wave form A, at the output of oscillator 10, is a continuous signal at the frequency of the oscillator. Wave form B, the output of the first control signal generator, is a positive pulse having a time duration of, for example, 10 microseconds, and an amplitude sufficient to render amplifier 11 operative. The output of amplifier 11 is shown in wave form C and comprises a burst of energy at the output frequency of the oscillator, having a time duration equal to the length of the control pulse from control signal generator 14, wave form B. Wave form D shows the control signal provided by synchronized control signal generator 15, which is similar in shape to the control signal B from the first control signal generator, but of the opposite polarity, as its purpose is to render the second control device 13 non-conductive. The leading edge of wave form D lags the leading edge of wave form B by a time interval, $\Delta T$. The output of second control device 13 is illustrated in wave form E and consists of a short burst of energy at the oscillator frequency, having a time duration equal to the interval between the initiation of control pulses B and D, or $\Delta T$.

In order to permit observation and study of the output signal pulses of the system, the pulse E is rectified, as by a detector diode 17, a 1N21C, having a detector load resistor 18, 1500 ohms. The stray capacitance of the system shunts resistor 18 and filters the radio frequency so that essentially the envelope of the radio frequency pulse E appears across the resistor. This is indicated as wave form F.

Figure 3:
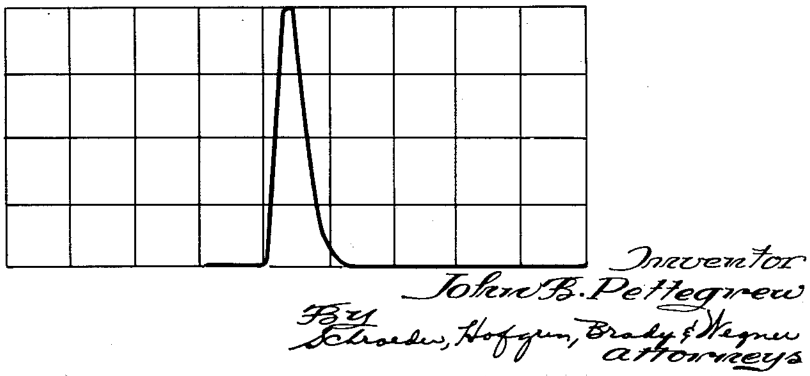
FIGURE 3 is a reproduction of an oscillograph picture of a rectified pulse of radio frequency energy produced by the circuit of FIGURE 1.

An oscilloscope 19 may be used to display this envelope, and FIGURE 3 is a reproduction of the trace of the envelope of a pulse generated by the above-described system, with the minimum $\Delta T$. The vertical lines of FIG- URE 3 indicate time intervals of 1/10 of one microsecond, so that the width of the output pulse, measured at the 70% power points, is 0.04 microsecond. In this particular instance, the frequency of the oscillator is 2500 megacycles, the amplitude of the rectified output of the detector is 30 millivolts, peak to peak, and the pulse repetition rate is 4800 pulses per second.

While I have shown and described certain embodiments of my invention, it is to be understood that it is capable of many modifications. Changes therefore, in the construction and arrangement may be made without departing from the spirit and scope of the invention as disclosed in the appended claims.

I claim:

1. A microwave pulse generator comprising: a source of microwave oscillation; a first traveling wave tube connected to said source of oscillation and normally non-conducting; a second traveling wave tube connected to the first and normally conducting; and control signal generating means connected to said traveling wave tubes for sequentially turning the first tube on and the second tube off, providing a pulse of microwave oscillations of duration determined by the time interval between the turning of the tubes on and off.

2. A microwave pulse generator comprising: a source of microwave oscillation; a traveling wave amplifying tube connected to said source of microwave oscillation and normally non-conducting; an attenuator connected to said first traveling wave amplifying tube; a second traveling wave amplifying device connected to said attenuator, and normally conducting; a first control signal generator connected with said first traveling wave tube for rendering the tube conductive; a second control signal generator connected with said second traveling wave amplifying tube for rendering it non-conductive, providing a pulse of oscillation of duration determined by the time interval between rendering the traveling wave tubes conductive and non-conductive; and means for synchronizing said control signal generators.

3. A pulse generator for generating pulses of oscillations of predetermined duration, comprising: a source of continuous oscillations of a desired frequency; a first gating device having an input connected to said source of oscillations and having an output, and being normally non-conducting; a second gating device having an input connected to the output of the first gating device and having an output, and being normally conducting; and control signal generating means connected to said gating devices for sequentially rendering the first gating device conducting and the second gating device non-conducting, providing a pulse of said oscillations at the output of the second gating device of a duration determined by the time interval between rendering the first and second gating devices conducting and non-conducting, respectively.

4. A pulse generator for generating pulses of continuous oscillations of predetermined duration, comprising: a source of oscillations of a desired frequency; a first gating device having an input connected to said source of oscillations and having an output, and being normally non-conducting; a second gating device having an input connected to the output of the first gating device and having an output, and being normally conducting; a first control signal generator connected with said first gating device for rendering the first gating device conducting; a second control signal generator connected with the second gating device for rendering said second gating device non-conducting, providing a pulse of said oscillations at the output of said second gating device of a duration determined by the time interval between rendering the first gating device conducting and the second gating device non-conducting; and means for synchronizing said control signal generators.

References Cited in the file of this patent

UNITED STATES PATENTS

| | | |
|---|---|---|
| 2,480,599 | Oxford | Aug. 30, 1949 |
| 2,552,579 | Pelton | May 15, 1951 |
| 2,593,113 | Cutler | Apr. 15, 1952 |
| 2,647,206 | Trousdale | July 28, 1953 |
| 2,651,718 | Levy | Sept. 8, 1953 |
| 2,677,053 | Nims | Apr. 27, 1954 |
| 2,680,215 | Mershon et al. | June 1, 1954 |
| 2,766,406 | Schwarzkoff | Oct. 9, 1956 |
| 2,792,525 | McArdle | May 14, 1957 |
| 2,917,641 | Montone | Dec. 15, 1959 |